(12) United States Patent
Morovic et al.

(10) Patent No.: US 10,379,800 B2
(45) Date of Patent: Aug. 13, 2019

(54) ADJUSTING PRINT SETTINGS BASED ON PERTURBATION STATISTICS

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB); Alex Andrea Tallada, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/540,860

(22) PCT Filed: Jan. 21, 2015

(86) PCT No.: PCT/US2015/012188
§ 371 (c)(1),
(2) Date: Jun. 29, 2017

(87) PCT Pub. No.: WO2016/118126
PCT Pub. Date: Jul. 28, 2016

(65) Prior Publication Data
US 2018/0004468 A1    Jan. 4, 2018

(51) Int. Cl.
*G06F 3/12* (2006.01)

(52) U.S. Cl.
CPC ............ *G06F 3/1285* (2013.01); *G06F 3/121* (2013.01); *G06F 3/1254* (2013.01); *G06F 3/1273* (2013.01); *G06F 3/1234* (2013.01)

(58) Field of Classification Search
CPC ...... G06F 3/1285; G06F 3/121; G06F 3/1254; G06F 3/1273; G06F 3/1234
USPC ........................................ 358/1.9, 3.06, 1.15
See application file for complete search history.

(56) References Cited

U.S. PATENT DOCUMENTS

| 5,760,913 | A | 6/1998 | Falk |
| 8,363,273 | B2 | 1/2013 | Morovic et al. |
| 2002/0126172 | A1 | 9/2002 | Akiyama |
| 2007/0024660 | A1 | 2/2007 | Bailey et al. |
| 2008/0144080 | A1* | 6/2008 | Randt ................ G06F 3/121 358/1.15 |
| 2010/0214576 | A1* | 8/2010 | Morovic ............. H04N 1/52 358/1.9 |
| 2011/0096364 | A1 | 4/2011 | Morovic et al. |

(Continued)

FOREIGN PATENT DOCUMENTS

| JP | 2005027060 | 1/2005 |
| JP | 2005096307 | 4/2005 |
| JP | 2008059457 | 3/2008 |

(Continued)

*Primary Examiner* — Quang N Vo
(74) *Attorney, Agent, or Firm* — HP Inc. Patent Department

(57) ABSTRACT

An example method involves analyzing a plurality of perturbations of a printing system over a period of time, calculating statistics corresponding to each of the plurality of the perturbations of the printing system, after the duration of the period of time, executing an enhancement process for the printing system based on the calculated statistics of each of the perturbations, and adjusting settings of the printing system based on results of the enhancement process.

15 Claims, 5 Drawing Sheets

(56) References Cited

U.S. PATENT DOCUMENTS

2013/0021631 A1    1/2013   Nachlieli et al.
2013/0057602 A1    3/2013   Aramendia et al.

FOREIGN PATENT DOCUMENTS

| JP | 2014071045 | 4/2014 |
|---|---|---|
| JP | 2014108622 | 6/2014 |
| WO | WO-2014114362 | 1/2013 |
| WO | WO-2014117803 | 1/2013 |

* cited by examiner

ADJUSTING PRINT SETTINGS BASED ON PERTURBATION STATISTICS

BACKGROUND

Printing systems or printers print images (e.g., a picture, a document, etc.) onto a substrate or a plurality of substrates (e.g., paper, cardboard, card stock, plastic, etc.). Printing systems therefore can convert digital information into physical images. Perturbations are unwanted errors (drop size, drop volume, line errors, misalignment, etc.) on images printed by a printing system.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve adjusting print settings based on perturbation statistics calculated from perturbations detected on actual printed media. As used herein, perturbations are print errors (e.g., drop placement errors, drop size errors, etc.) that cause an image to appear flawed (e.g., off color, off axis, grainy, lined, etc.) or in a form that is unintended. In examples disclosed herein, perturbations are detected and analyzed and statistics are calculated based on detected perturbations. An example enhancement process is run using a variety of parameters including the statistics or distributions of the detected perturbations to determine proper adjustments of settings of the printer to limit or minimize the occurrence of the perturbations in the future. In some examples disclosed herein, settings of a printer or system of printers may be adjusted to alter Neugebauer Primary area coverage (NPac) for the printer or printers to account for the detected perturbations and limit color variation or drop placement errors.

Over time, printers or printing systems change as mechanisms of the printing systems age. These changes may cause drop placement errors or other issues that affect a printer's ability to accurately print an intended image. For example, a printhead may become covered in dried ink which may affect an ink drop size or an ink drop placement on a sheet of paper. Examples disclosed herein involve monitoring actual printed media and detecting perturbations to adjust settings of a printer or a plurality of printers without requiring replacement of parts or manual maintenance of the printer(s).

An example method includes analyzing a plurality of perturbations of a printing system over a period of time, calculating statistics corresponding to each of the plurality of the perturbations of the printing system, after the duration of the period of time, executing an enhancement process for the printing system based on the calculated statistics of each of the perturbations, and adjusting settings of the printing system based on results of the enhancement process. An example apparatus includes a perturbation analyzer to analyze perturbations detected on actual printed media, a statistics calculator to calculate statistics for the detected perturbations, an enhancer to run an enhancement process based on the statistics, and a printer interface to adjust settings of a printer based on results of the enhancement process.

Figure 1:
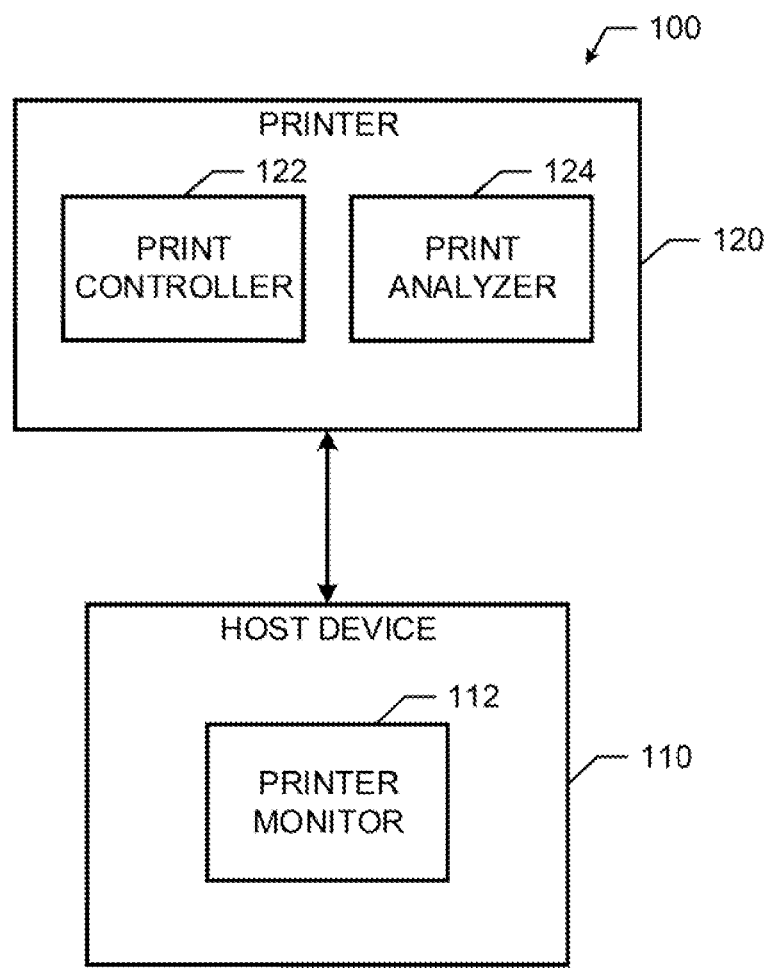
FIG. 1 illustrates a schematic diagram of an example printing system that may be implemented in accordance with an aspect of this disclosure.

FIG. 1 is a schematic diagram of an example printing system 100 that may be implemented in accordance with an aspect of this disclosure. The example printing system 100 includes a host device 110 and a printer 120. The example host device 110 includes an example printer monitor 112 constructed in accordance with the teachings of this disclosure. Examples disclosed herein involve the printer monitor 112 monitoring printed media of the printer 120 and adjusting print settings of the printer 120 based on detected perturbations or statistics corresponding to the detected perturbations.

The example printer 120 includes a printer controller 122 and a print analyzer 124. The example printer controller 122 controls mechanisms (e.g., print heads, ink jets, ink cartridges, toners, rollers, etc.) of the printer 120 to print media or images onto a substrate. The printer controller 122 may have various settings to control the application of ink or other substance to the substrate. For example, settings may include drop placement settings (e.g., size of drops, locations of drops, etc.), speed settings, margin settings, etc. In some examples, the printer controller 122 may adjust drop placement settings for each print head of the printer 120 based on analyses performed in accordance with the teachings of this disclosure. For example, the printer controller 122 may receive instructions or information from the printer monitor 112 to adjust settings of the print head to alter drop placement.

The example print analyzer 124 of FIG. 1 analyzes results of media (e.g., images, documents, text, etc.) printed by the printer 120. For example, the print analyzer 124 may include a line sensor, a spectrophotometer (or colorimeter), or a camera to analyze media printed on substrates by the printer 120. In such examples, a line sensor may determine drop size or placement variation and a spectrophotometer may determine color variation of the printed media. In some examples, a camera may similarly be used to determine or analyze media printed by the printer 120. The print analyzer 124 of FIG. 1 may forward analysis or information (e.g., images captured by a camera, data from a line sensor, data from a spectrophotometer/colorimeter, etc.) to the host device 110 or the printer monitor 112.

In some examples, the print analyzer 124 of FIG. 1 may identify, detect, or determine the presence of perturbations in the printed media. For example, the print analyzer 124 may compare actual printed media with expected printed media (i.e., media that is intended to be printed without any perturbations). In some examples, the print analyzer 124 may analyze designated types of printed media, such as print charts, color charts, calibration charts, etc. to detect the perturbations. In other examples, any type of actual printed media (e.g., a picture, a document, etc.) may be compared with expected printed media. The print analyzer 124 may incorporate any suitable image analysis or image processing technique to compare media or data (e.g., sensor data) corresponding to the media to detect the perturbations. For example, the print analyzer 124 may compare an image of actual printed media and an expected image of the actual printed media using image process. The print analyzer 124 may detect perturbations in the actual media based on the differences in the compared images.

The host device 110 in the illustrated example of FIG. 1 may be any computing device, such as a personal computer (e.g., a laptop computer, desktop computer, etc.) a mobile device (e.g., a tablet computer, a smartphone, a personal digital assistant (PDA), etc.), a server, etc. A user may access the printer 120 via the host device 110 to print media (e.g., images, documents, etc.) onto substrates (e.g. paper, cardboard, card stock, plastic, etc.). For example, the user may create the media to be printed by the printer 120 using applications or programs stored or executed by the host device 110 using any suitable technique. The host device 110 may be communicatively coupled with the printer 120 via a direct communication link (e.g., a wired or wireless communication link) or an indirect communication link (e.g., via a communication link involving a network or other device).

The example host device 110 includes an example printer monitor 112 constructed in accordance with the teachings of this disclosure. In some examples, the printer monitor 112 may be located on the printer 120 or another device in communication with the printer 120 of FIG. 1. For example, the printer monitor 112 may be located on a cloud server or server connected to a printer network including the printer 120. The example printer monitor 112 may communicate with the print analyzer 124 to retrieve or receive analysis of printed media to determine whether settings of the printer 120 or printer controller 122 are to be adjusted in accordance with the teachings of this disclosure.

Figure 2:
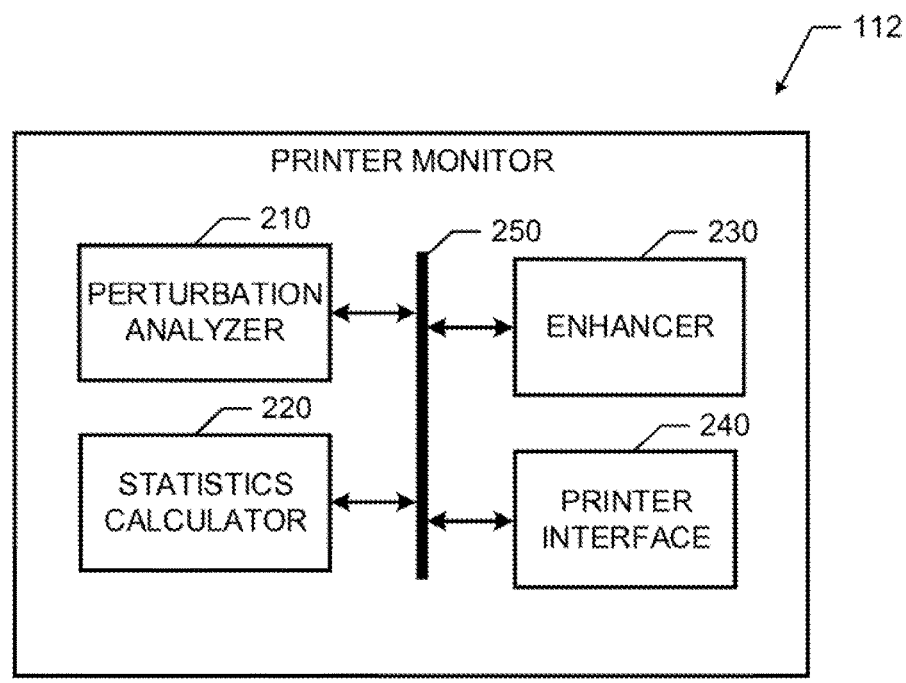
FIG. 2 a block diagram of an example printer monitor that may be implemented by the printing system of FIG. 1.

FIG. 2 is a block diagram of an example printer monitor 112 that may be used to implement the example printer monitor 112 of FIG. 1. The example printer monitor 112 of FIG. 2 includes a perturbation analyzer 210, a statistics calculator 220, an enhancer 230, and a printer interface 240. The perturbation analyzer 210, the statistics calculator 220, the enhancer 230, and the printer interface 240 may communicate with one another via a communication bus 250.

The example perturbation analyzer 210 of FIG. 2 identifies or determines the perturbations in actual printed media printed by a printer (e.g., the printer 120). In examples disclosed herein, the perturbation analyzer 210 may identify the perturbations from analyses from the print analyzer 124 or determine perturbations from the images or data received from the print analyzer 124 in comparison with an expected media print out (e.g., similar to operations described above in connection with the print analyzer 124). The expected media corresponding to the printed media may be media that is intended to be printed without any perturbations. The example perturbation analyzer 210 may detect specific perturbations on printed media or patterns of perturbations (e.g., a plurality of perturbations) on printed media based on a comparison of an actual printed media and an expected media corresponding to the actual printed media. In some examples, the perturbation analyzer 120 may identify recurring perturbations or recurring patterns of perturbations (e.g., a same perturbation or a same perturbation pattern that reoccurs on a single piece of printed media). As used herein, the term "perturbation" may be used to refer to a single perturbation, a pattern of perturbations, recurring perturbations, recurring patterns of perturbations, etc.

The perturbation analyzer 210 may generate information corresponding to detected perturbations. For example, the perturbation analyzer 210 may apply an identifier to detected perturbations or information representative of the detected perturbations (e.g., error type, location on media, drop characteristics, color errors, etc.). Accordingly, the perturbation analyzer 210 may determine that a perturbation corresponds to a previously detected perturbation. The perturbation analyzer 210 may apply a same identifier to a newly detected perturbation that corresponds to the previously detected perturbation. In some examples, the perturbation analyzer 210 may assign a new identifier to perturbations that have not been previously detected or communicated to the printer monitor 112. Example identifiers or information accompanying the identifiers of the perturbations may indicate characteristics of the perturbations (e.g., perturbation type, perturbation pattern, perturbation location, perturbation color difference, drop placement error type (e.g., size, color, location, etc.), etc.). Accordingly, the perturbation analyzer 210 identifies or detects perturbations in printed media and may provide information corresponding to the perturbations to the statistics calculator 220, statistics analyzer 230, or enhancer 240 of the print monitor 112 via the communication bus 250.

The example statistics calculator 220 of FIG. 2 may calculate statistics corresponding to perturbations detected by the print analyzer 124 or the perturbation analyzer 210. Accordingly, the statistics calculator 220 may track a plurality of detected perturbations for a particular printer (e.g., the printer 120) or a plurality of printers (e.g., printers that are a same type (e.g., ink jet), printers that are a same model, etc.). The statistics calculator 220 may calculate statistics corresponding to an occurrence of the detected perturbations of media printed by the printer 120. In some examples, the statistics calculator 220 may calculate statistics corresponding to a combination of detected perturbations. For example, the statistics calculator 220 may calculate that one perturbation (or perturbation pattern) occurs on 5% of pages printed by the printer 120 and another perturbation (or perturbation pattern) occurs on 50% of pages printed by the printer 120. In some examples, the statistics calculator 220 may calculate statistics corresponding to a type or model of the printer 120. In such examples, the printer monitor 112 may retrieve or receive analysis or data from print, analyzers 124 of a plurality of printer 120 (e.g., see FIG. 3).

The example enhancer 230 of FIG. 2 runs an enhancement process using the statistics (e.g., distributions) calculated by the statistics calculator 220 that correspond to the perturbations analyzed by the perturbation analyzer 210. The example enhancement process may be any enhancement process suitable for determining appropriate print settings for correction or removal of the determined perturbations. For example, a similar process that is Halftone Area Neugebauer Separation (HANS) system may be executed. In a HANS system, a Neugebauer Primary area coverage (NPac) may be calculated based on an input image. A HANS system may then apply a halftoning step that selects output element combinations, e.g. Neugebauer Primaries (NPs), device states or ink-overprints, based on an NPac vector at every pixel. In examples disclosed herein, a HANS enhancement process may be executed based on statistics or distributions corresponding to actual perturbations identified in media printed by a printer (e.g., the printer 120 of FIG. 1).

The example enhancer 230 may consult a look-up table including NPac choices that correspond to the calculated statistics and options for providing least color variation based on the actual detected perturbations or statistics corresponding to the detected perturbations. In examples disclosed herein, the enhancer 230 may be generate the look-up table based on iterations of detecting the perturbations, calculating the statistics corresponding to the detected perturbations, and executing an enhancement process based on the perturbations or statistics corresponding to the perturbations. Accordingly, the look-up table may be collocated with the printer monitor 112 of FIG. 1 or 2 or on a separate device (e.g., a database, storage device, etc.) in communication with the printer monitor 112.

In some examples, the enhancer 230 may consider various parameters when executing an enhancement process. For example, the enhancer 230 may consider an age of a printer (e.g., based on time, based on uses, based on time powered on, based on pages printed, etc.) when the perturbations were calculated, a printer model, a printer type, etc. when executing an enhancement process. The example enhancer 230 of FIG. 2 may consider perturbation information measured or received during a designated time period (e.g, the last three months) and disregard data measured prior to that. In some examples, the enhancer may apply various weights to particular parameters. For example, measurements made prior to a printhead replacement may be given less weight than measurements taken after a printhead replacement because the printer is no longer in that state. In some examples, a weighted combination of default parameters (e.g., parameters used for the printers when manufactured) for the printer 120 and parameters determined by the print monitor 112 (e.g., via the enhancer 230) due to actual perturbations detected by the printer 120. Such a weighted combination may provide increased stability across a given model of printer (e.g., frequent adjustments may not need to be made each time a perturbation is detected). Such parameters or settings for the enhancer 230 may be adjusted by a user via a user interface (e.g., a user interface implemented by the interface circuit 520, the input device(s) 522, or the output device(s) 524 of FIG. 5).

Accordingly, the enhancer 230 of FIG. 2 identifies parameters (e.g., perturbations, statistics corresponding to the perturbations, printer age, printer characteristics, printer maintenance, etc.) for an enhancement process and executes the enhancement process to determine adjustments that may be made to the printer 120 that may result in a lesser or least color variation when printed on the printer 120. Such adjustments may be used to alter or change NPac for components (e.g., print heads) of the printer 120. The enhancer 230 may forward instructions or information based on such adjustments to the printer interface 240.

The example printer interface 240 of FIG. 2 may be used to communicate with a printer controller (e.g., the printer controller 122) of a printer (e.g., the printer 120). Accordingly, in examples involved herein, the printer interface 240 may send instructions or information to the printer controller 122 to adjust settings as determined by the enhancer 230 based on results of executing the enhancement process.

While an example manner of implementing the printer monitor 112 of FIG. 1 is illustrated in FIG. 2, at least one of the elements, processes or devices illustrated in FIG. 2 may be combined, divided, re-arranged, omitted, eliminated or implemented in any other way. Further, the perturbation analyzer 210, the statistics calculator 220, the enhancer 230, the printer interface 240 or, more generally, the example printer monitor 112 of FIG. 2 may be implemented by hardware or any combination of hardware and executable instructions (e.g., software or firmware). Thus, for example, any of the perturbation analyzer 210, the statistics calculator 220, the enhancer 230, the printer interface 240 or, more generally, the example printer monitor 112 could be implemented by at least one of an analog or digital circuit, a logic circuit, a programmable processor, an application specific integrated circuit (ASIC), a programmable logic device (PLD) or a field programmable logic device (FPLD). When reading any of the apparatus or system claims of this patent to cover a purely software or firmware implementation, at least one of the perturbation analyzer 210, the statistics calculator 220, the enhancer 230 or the printer interface 240 is/are hereby expressly defined to include a tangible computer readable storage device or storage disk such as a memory, a digital versatile disk (DVD), a compact disk (CD), a Blu-ray disk, etc. storing the executable instructions. Further still, the example printer monitor 112 of FIG. 2 may include at least one element, process or device in addition to, or instead of, those illustrated in FIG. 2, or may include more than one of any or all of the illustrated elements, processes and devices.

Figure 3:
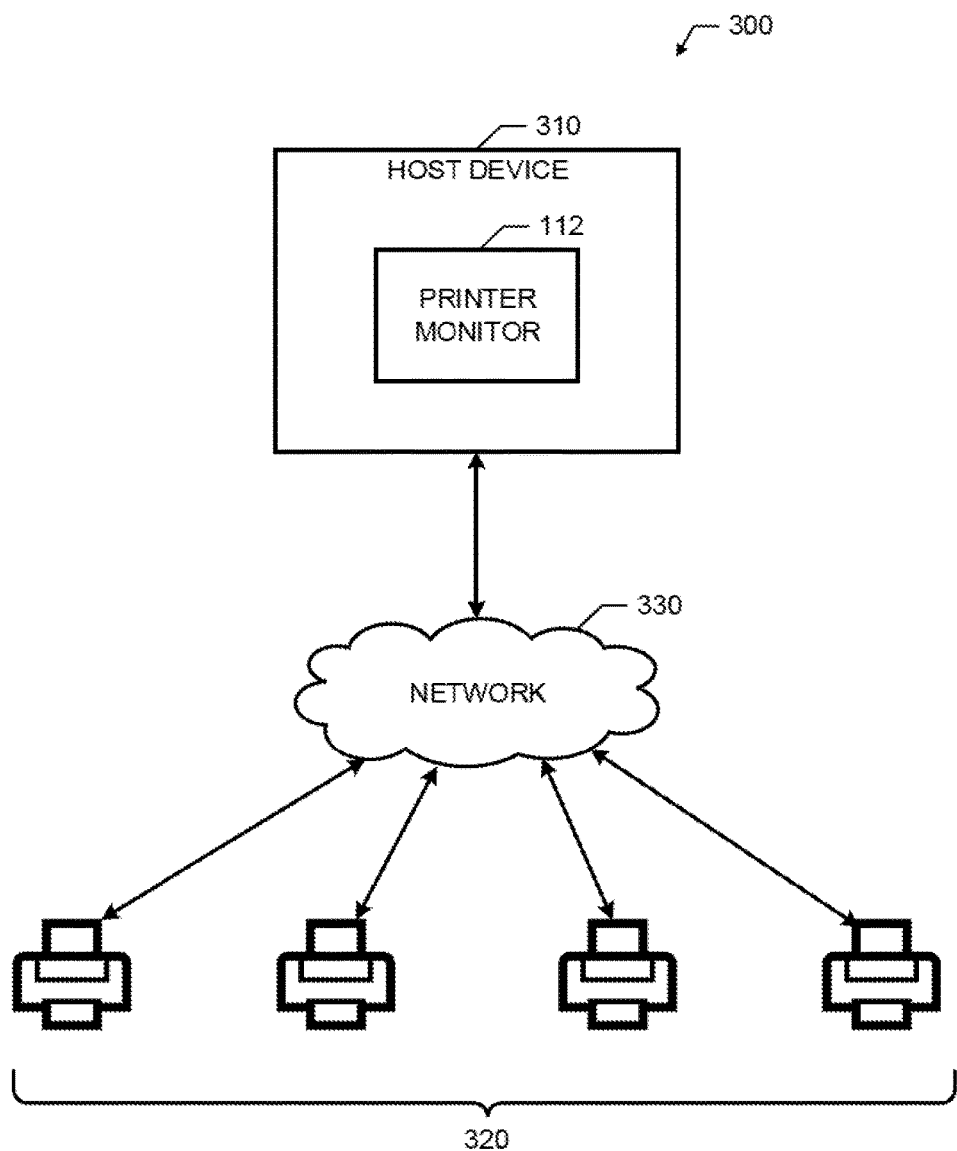
FIG. 3 illustrates a schematic diagram of another example printing system that may be implemented in accordance with an aspect of this disclosure.

FIG. 3 is a schematic diagram of an example printing system 300 that may be implemented in accordance with an aspect of this disclosure. The example printing system 300 of FIG. 3 includes a host device 310, a plurality of printers 320, and a network 330. The example network 330 may be any type of network, including a local area network (LAN), a wide area network (WAN), the Internet, etc. The example host device 310 includes a printer monitor 112, which may be implemented by the printer monitor 112 of FIG. 2 in accordance with the teachings of this disclosure.

Each of the plurality of printers 320 in the illustrated example of FIG. 3 may be a same printer type or printer model, such as a same type or same model of the printer 120 of FIG. 1. Although the plurality of printers 320 in the illustrated example of FIG. 3 includes four printers, any number of printers may be included in the plurality of printers 320. Accordingly, each of the plurality of printers 320 may include a printer controller (e.g., the printer controller 122) and a print analyzer (e.g., the print analyzer 124) that may communicate with the printer monitor 112 of FIG. 3. The plurality of printers 320 may periodically or aperiodically send perturbation information (e.g. images or data corresponding to actual printed media) to the host device 310 via the network 330.

In the illustrated example of FIG. 3, the printer monitor 112 may use information corresponding to perturbations of actual printed media from the plurality of printers 320 in accordance with the teachings of this disclosure. For example, print analyzers on the plurality of printers may send perturbation information (e.g., sensor data, image data from a camera, etc.) or perturbation analyses (e.g., comparisons analysis of expected prints versus actual prints, etc.) to the printer monitor 112 of FIG. 3. The example printer monitor 112 may calculate perturbation statistics as described above for each or the plurality of printers or perturbations statistics for the plurality of printers as a group. The printer monitor 112 may use the statistics for the detected perturbations across the plurality of printers to determine whether adjustments for any of the plurality of printers 320 is needed. For example, a first printer of the plurality of printers 320 may begin to print media with a first perturbation pattern. Based on statistics (e.g., statistics based on occurrence, variation, distribution, etc.) of the detected first perturbation pattern including (e.g., calculated from previous iterations or detections of perturbations printed by the first printer or any of the other printers of the plurality of printers 320), the printer monitor 112 may run an enhancement process based on the statistics of the perturbation pattern occurring on the first printer or on the plurality of printers 320. The printer monitor 112 may then instruct or provide information to the first example printer to adjust print settings to limit color variation or enhance print quality.

Accordingly, perturbations detected from actual printed media from a plurality of printers (e.g., a system of printers for a given entity, a system of printers of a same type or model, etc.) may be used to adjust print settings for a printer (e.g., the printer 120) or a plurality of printers (e.g., the plurality of printer 320).

Figure 4:
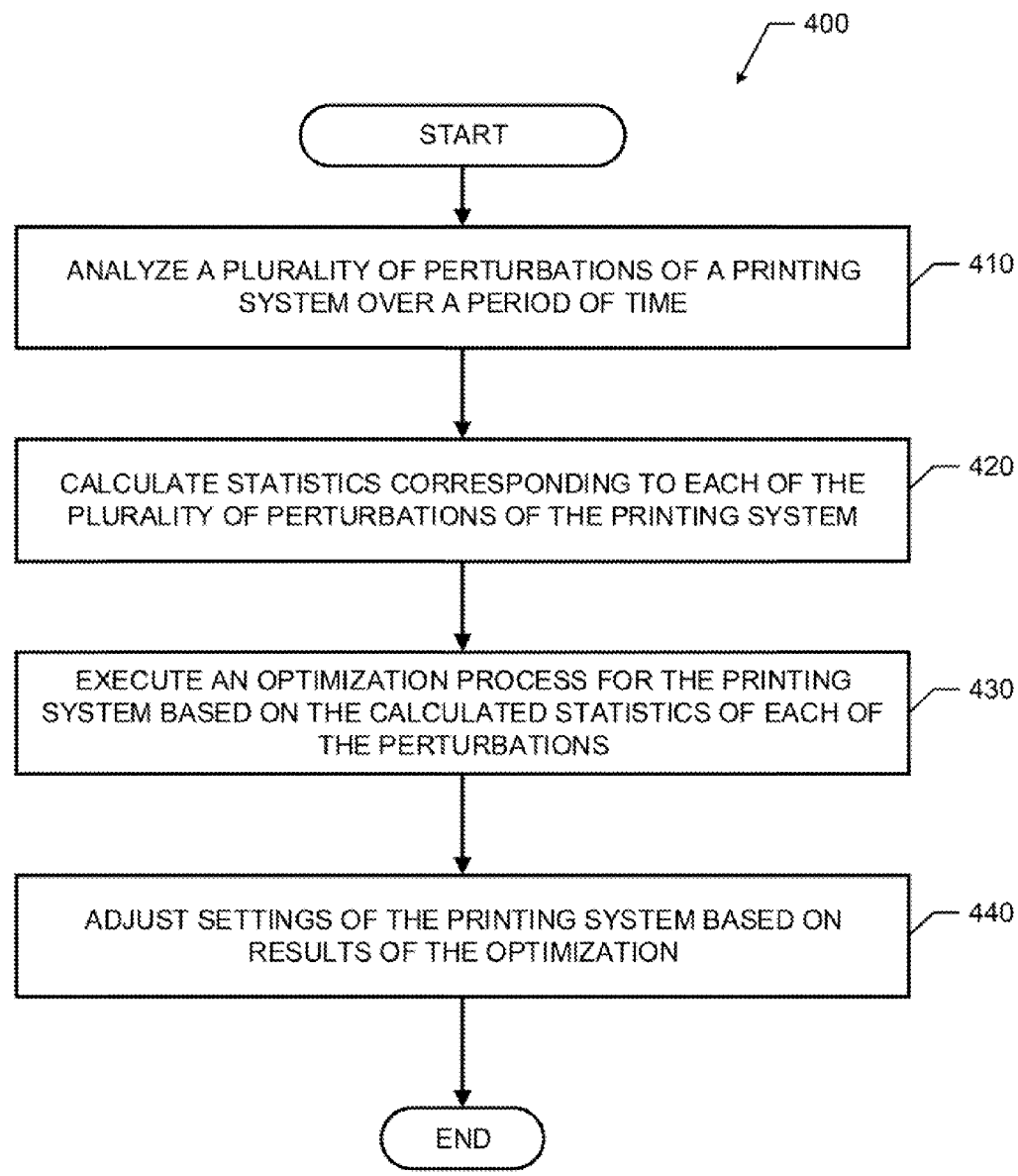
FIG. 4 is a flowchart representative of example machine readable instructions that may be executed to implement the touch detector of FIG. B.

A flowchart representative of example machine readable instructions for implementing the printer monitor 112 of FIG. 2 is shown in FIG. 4. In this example, the machine readable instructions comprise a program/process for execution by a processor such as the processor 512 shown in the example processor platform 500 discussed below in connection with FIG. 5. The program/process may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 512, but the entire program/process or parts thereof could alternatively be executed by a device other than the processor 512 or embodied in firmware or dedicated hardware. Further, although the example program is described with reference to the flowchart illustrated in FIG. F, many other methods of implementing the example A1 may alternatively be used. For example, the order of execution of the blocks may be changed, or some of the blocks described may be changed, eliminated, or combined.

The process 400 of FIG. 4 begins with an initiation of the printer monitor 112 (e.g., upon startup, upon instructions from a user, upon startup of a device implementing the printer monitor 112 (e.g., the host device 110), etc.). At block 410, the perturbation analyzer 210 analyzes a plurality of perturbations (e.g., individual perturbations or patterns of perturbations) of a printing system (e.g., a printer or a plurality of printers) over a period of time. At block 420, the statistics calculator 220 calculates statistics corresponding to each of the plurality of perturbations of the printing system. The example statistics calculated at block 420 may be based on perturbations detected from a same printer or a plurality of printers (e.g., a plurality of printers of a same type or model).

In FIG. 4, at block 430, the enhancer 230 executes an enhancement process for the printing system (e.g., the printer 120 or the plurality of printers 320) based on the calculated statistics of each of the perturbations. In other words, at block 430, the enhancer uses the calculated statistics as parameters for an enhancement process (e.g., a HANS enhancement process). In some examples, at block 430, the enhancer 230 may consult a look-up table (e.g., a look-up table charting statistics and corresponding NPac) for determining enhancement parameters or enhancement results. In some examples, after block 430, the enhancer 230 may add results of the enhancement process to a look-up table that may be consulted by other devices such as other printers associated with the printing system. At block 440, the printer interface 240 may adjust or cause adjustment (e.g., by sending information to a printer or plurality of printers) of settings of the printing system based on results of the enhancement process. After block 440, the process 400 ends. In some examples, after block 440, control may return to block 410. For example, the process 400 may be executed periodically (e.g., every 30 days of operation, every day, etc.) or aperiodically (e.g., after the printer encounters an error, begins to run low on ink, after a designated number of print jobs or pages printed, etc.).

As mentioned above, the example process(es) of FIG. 4 may be implemented using coded instructions (e.g., computer or machine readable instructions) stored on a tangible computer readable storage medium such as a hard disk drive, a flash memory, a read-only memory (ROM), a compact disk (CD), a digital versatile disk (DVD), a cache, a random-access memory (RAM) or any other storage device or storage disk in which information is stored for any duration (e.g., for extended time periods, permanently, for brief instances, for temporarily buffering, or for caching of the information). As used herein, the term tangible computer readable storage medium is expressly defined to include any type of computer readable storage device or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded, instructions (e.g., computer or machine readable instructions) stored on a non-transitory computer or machine readable medium such as a hard disk drive, a flash memory, a read-only memory, a compact disk, a digital versatile disk, a cache, a random-access memory or any other storage device or storage disk in which information is stored for any duration (e.g., for extended time periods, permanently, for brief instances, for temporarily buffering, or for caching of the information). As used herein, the term non-transitory computer readable medium is expressly defined to include any type of computer readable storage device or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 5:
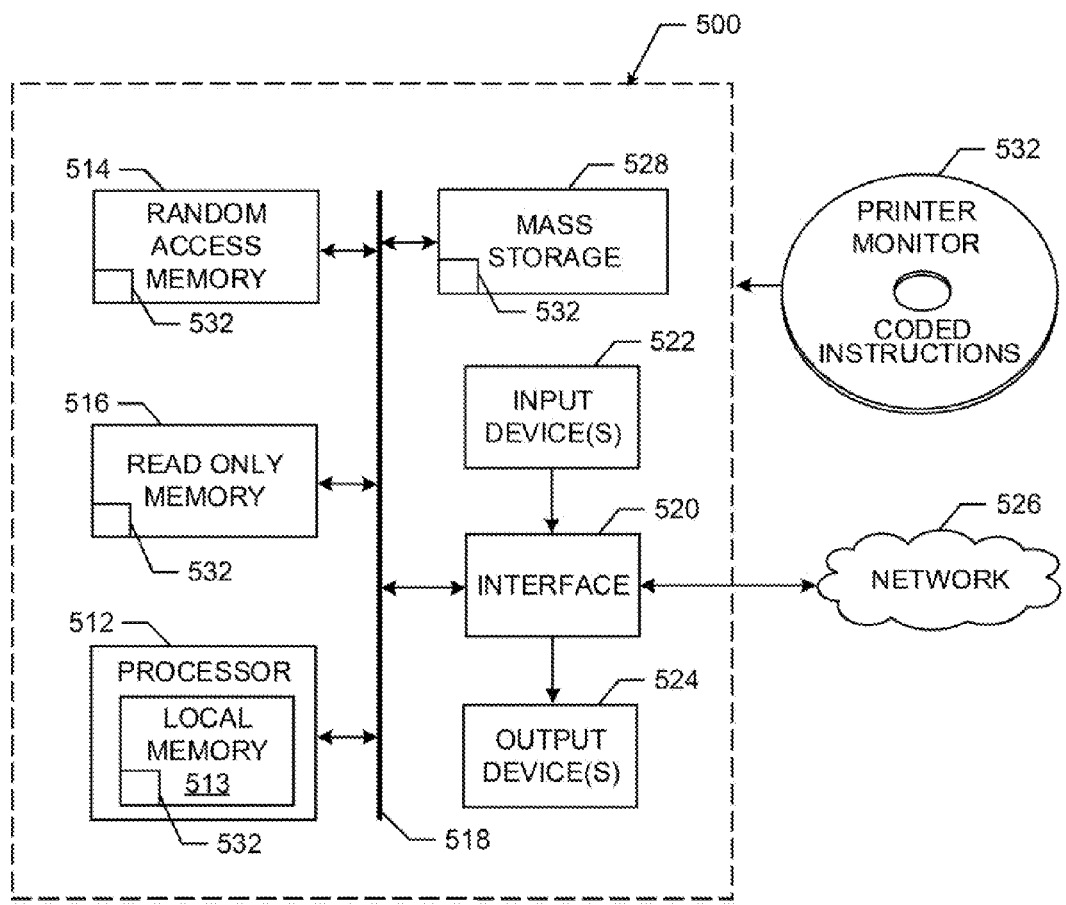
FIG. 5 is a block diagram of an example processor platform capable of executing the instructions of FIG. 4 to implement the printer monitor of FIG. 2.

FIG. 5 is a block diagram of an example processor platform 500 capable of executing the instructions of FIG. 5 to implement the printer monitor 112 of FIG. 2. The example processor platform 500 may be or may be included in any type of apparatus, such as a server, a personal computer, a mobile device (e.g., a cell phone, a smart phone, a tablet, etc.), a personal digital assistant (RDA), an Internet appliance, a printer, or any other type of computing device.

The processor platform 500 of the illustrated example of FIG. 5 includes a processor 512. The processor 512 of the illustrated example is hardware. For example, the processor 512 can be implemented by at least one integrated circuit, logic circuit, microprocessor or controller from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) or any other type of random access memory device. The non-volatile memory 516 may be implemented by flash memory or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), or a peripheral component interconnect (PCI) express interface.

In the illustrated example, at least one input device 522 is connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint or a voice recognition system.

At least one output device 524 is also connected to the interface circuit 520 of the illustrated example. The output device(s) 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer or speakers). The interface circuit 520 of the illustrated example, thus, may include a graphics driver card, a graphics driver chip or a graphics driver processor.

The interface circuit 520 of the illustrated example also includes a communication device such as a transmitter, a receiver, a transceiver, a modem or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes at least one mass storage device 528 for storing executable instructions (e.g., software) or data. Examples of such mass storage device(s) 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the local memory 513 in the volatile memory 514, in the non-volatile memory 516, or on a removable tangible computer readable storage medium such as a CD or DVD.

From the foregoing, it will be appreciated that the above disclosed methods, apparatus and articles of manufacture involve monitoring actual printed media to detect perturbations on the printed media and adjusted print settings based on statistics corresponding to the perturbations. Examples disclosed herein involve monitoring a single printer or a plurality of printers and adjusting settings to the single printer or at least one of the plurality of printers based on statistics corresponding to detected perturbations on actual printed media. The determined statistics may be used to run an enhancement process (e.g., a HANS enhancement process) to limit or minimize color variation, drop variation, etc. Accordingly, examples disclosed herein allow for robustness in adjusting print settings for certain printers when perturbations are detected over the course of a printer lifetime or lifetimes of a plurality of printers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   analyzing a plurality of perturbations of a printing system over a period of time;
   calculating statistics corresponding to each of the plurality of the perturbations of the printing system;
   after the duration of the period of time, executing, via a processor, an enhancement process for the printing system based on the calculated statistics of each of the perturbations; and
   adjusting settings of the printing system based on results of the enhancement process.

2. The method as defined in claim 1, wherein the settings of the printing system are adjusted based on settings corresponding to the results of the enhancement process identified in a look-up table.

3. The method as defined in claim 2, wherein the look-up table is generated from multiple iterations of running the enhancement process for the printing system.

4. The method as defined in claim 1, wherein the printing system comprises a plurality of printers, and wherein each of the plurality of printers are a same model of printer.

5. The method as defined in claim 1, further comprising identifying the plurality of perturbations based on a comparison of expected images to be printed by the printing system and actual printed images printed by the printing system.

6. The method as defined in claim 1, wherein adjusting settings of the print system causes a change in a Neugebauer primary area coverage of a printer of the print system.

7. An apparatus comprising:
   a perturbation analyzer to analyze perturbations on actual printed media from a printer;
   a statistics calculator to calculate statistics corresponding to the perturbations;
   an enhancer to run an enhancement process based on the statistics of the perturbations; and
   a printer interface to provide information to a printer to adjust print settings based on results of the enhancement process.

8. The apparatus as defined in claim 7, wherein the statistics are calculated based on the analyzed perturbations and occurrence of the perturbations on other actual printed media from the printer.

9. The apparatus as defined in claim 7, wherein the statistics are calculated based on the analyzed perturbations and perturbations detected from other actual printed media from another printer.

10. The apparatus as defined in claim 7, wherein the enhancer runs a halftone area Neugebauer separation enhancement process.

11. The apparatus as defined in claim 7, wherein the perturbation analyzer analyzes the perturbations based on images from a camera located on the printer.

12. The apparatus as defined in claim 7, wherein the calculated statistics correspond to perturbations that occurred on the actual printed media during a selected time period.

13. A non-transitory machine readable storage medium comprising instructions that, when executed, cause a machine to at least:
   determine the presence of perturbations on actual printed media from a printer;
   calculate statistics corresponding to the perturbations occurring during a period of time;
   execute an enhancement process based on the calculated statistics and the period of time; and
   instruct the printer to adjust print settings based on results of the enhancement process.

14. The non-transitory machine readable storage medium as defined in claim 13, wherein the instructions, when executed, further cause the machine to:

determine the presence of second perturbations on second actual printed media from a second printer;

calculate second statistics corresponding to the perturbations and the second perturbations during the period of time; and execute the enhancement process based on the calculated statistics and second statistics.

15. The non-transitory machine readable storage medium as defined in claim 13, wherein the instructions, when executed, further cause the machine to:

determine the presence of the perturbations by comparing a captured image of the actual printed media to an expected image of the actual printed image.

* * * * *